Oct. 2, 1956

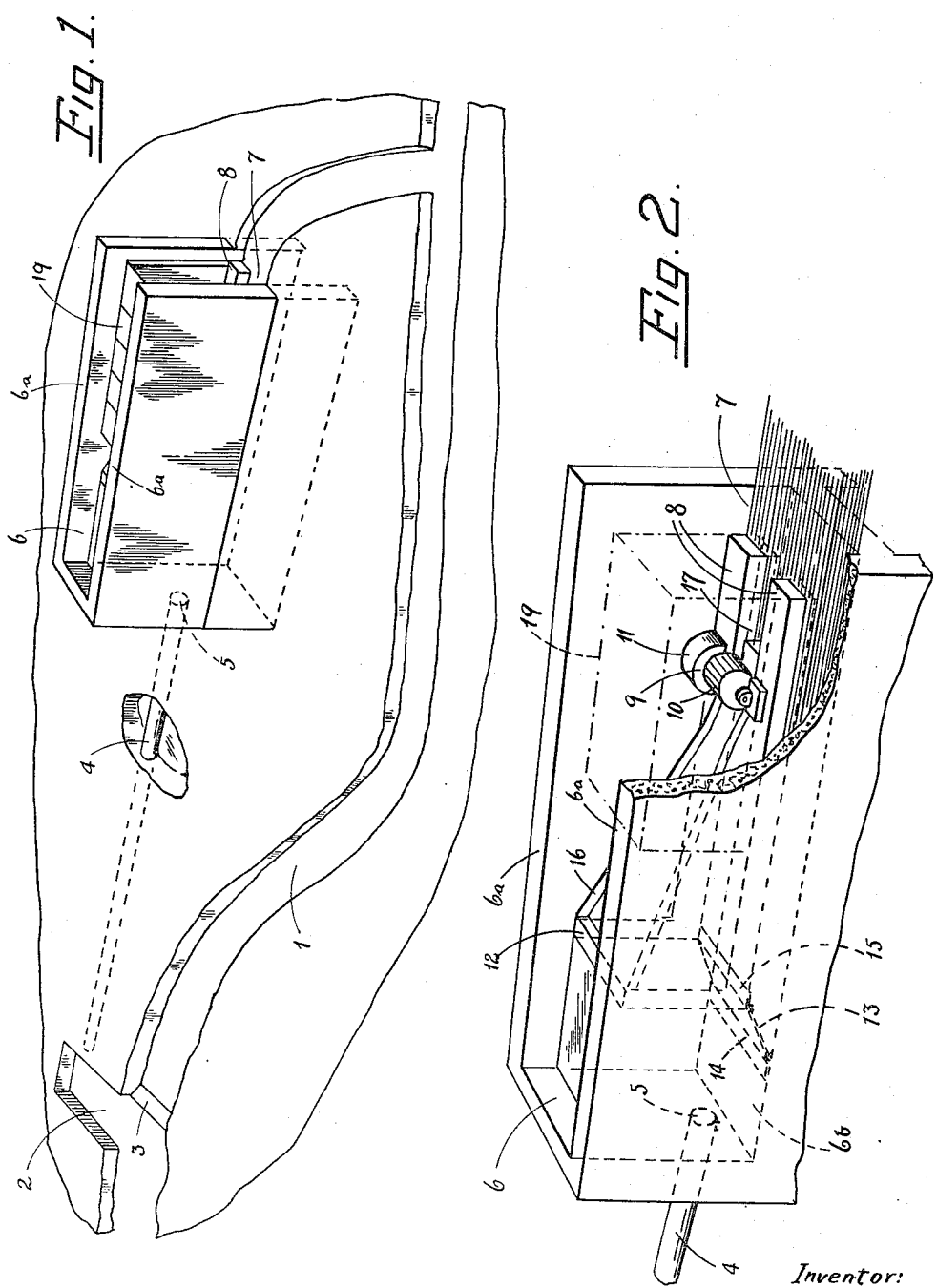

P. DOWLING 2,764,871

HYDRO-ELECTRIC POWER APPARATUS

Filed March 29, 1952

Inventor:
Patrick Dowling
By
Young, Emery & Thompson attys.

United States Patent Office 2,764,871
Patented Oct. 2, 1956

2,764,871
HYDRO-ELECTRIC POWER APPARATUS

Patrick Dowling, Dublin, Ireland

Application March 29, 1952, Serial No. 279,291

Claims priority, application Ireland March 31, 1951

4 Claims. (Cl. 61—19)

This invention relates to improvements in hydroelectric plant and has for its principal object to provide a relatively inexpensive construction of plant for operation in rivers and tidal waters.

A further object of the invention is to provide hydro-electric generating plant mounted on a pontoon structure comprising a pair of spaced pontoons, which floats in a channel in which the pontoon forms a gate, thereby providing a substantially constant head of water to drive the generator. A still further object is to provide a simple arrangement for controlling the admission of water to the hydro-electric generator.

According to the invention the foregoing objects are achieved by providing a hydro-electric plant including a water channel, an inlet and an outlet therefor, means for obturating said channel comprising a pontoon structure comprising a pair of spaced pontoons and having an upwardly extending vertical front wall forming a gate slidable between the side walls of said channel and forming a sealing engagement therewith, and a baffle plate pivotally connected between the pontoon structure and the floor of said channel and extending completely between the side walls thereof, hydro-electric generator means mounted on said pontoon, a millrace for said generator leading from said gate to the generator intake, and a tailrace leading from the hydro-electric generator to the outlet of the water channel. The pontoon may also include means for adjusting the level of one end of said pontoon with respect to the other end thereof comprising ballast tanks carried by the pontoon.

These and other features of the invention are hereinafter described with reference to the accompanying drawing, wherein Fig. 1 is a perspective view showing more or less diagrammatically the general layout of a hydro-electric installation embodying the invention.

Fig. 2 is a perspective view of the plant to an enlarged scale, part being taken away.

Figure 3:
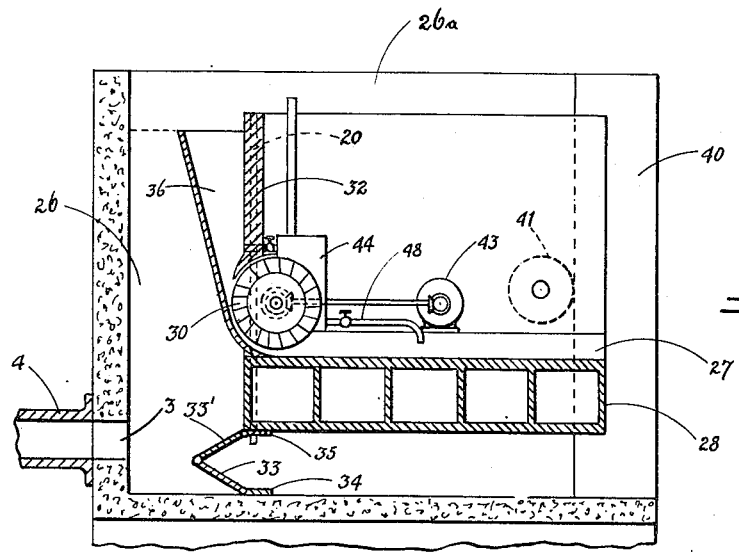
Fig. 3 is a sectional elevation showing an alternative form which the plant may take (the section being taken substantially on line III of Fig. 4)

Referring to the drawings, Fig. 1 shows diagrammatically a hydro-electric installation incorporating the invention and arranged to utilise water power derived from a river 1 in descending from an upper level to a lower level. It is not necessary to construct a dam of large dimensions to provide a substantial reservoir of water to ensure a constant supply at all times. On the contrary, it is only necessary to provide a relatively small basin 2 (Fig. 1), for example by the provision of a weir 3, from which a pipe 4 of suitable calibre and length conducts the necessary quantity of water to the inlet 5 of the channel 6. The latter is built by well known methods of reinforced concrete constructions at a suitable site adjacent to a low level part of the river 1. The side walls 6a of the channel 6 extend downwards for a suitable distance for adequate foundation, and upwards to at least the same height as the possible flood water level in the basin 2. The outlet 7 of the channel communicates with a lower reach of the river 1.

As shown more clearly in Fig. 2, a pontoon structure 8 comprising a pair of spaced pontoons floats in the channel 6 and carries a hydro-electric generator 9, which in the example shown comprises a water wheel 10 coupled to an electric dynamo 11. The channel 6 is closed at the end adjacent to the inlet 5 and the end of the pontoon structure 8 adjacent to said inlet 5 is extended vertically to form a wall or gate 12 extending fully between the vertical side walls 6a of the channel 6. Below the pontoon structure 8 a baffle plate 13, also extending fully between the side walls 6a is hinged along its lower horizontal edge to an anchor plate 14 rigidly secured to the bottom 6b of the channel 6, and along its upper horizontal edge to a hinge plate 15 firmly secured to the bottom of the pontoon structure 8. An inclined runway 16 extending from the top of the gate 12 to the intake of the water wheel 10 forms a millrace for said wheel, while on the outlet side of said wheel the pontoon is shaped to provide a tailrace 17 leading to the outlet 7 of the channel 6. The pontoon structure 8 preferably also has a roof or canopy 19.

A substantially constant head of water for driving the water wheel 10 is secured by reason of the fact that water flowing from the inlet pipe 4 will be retained by the gate 12 and the hinged baffle plate 13, and will rise in said channel until it reaches the top of the gate 12 and then will overflow into the millrace 16, thus operating the water wheel 10 and passing away by the tailrace 17 and channel outlet 7, from which it ultimately passes back to a lower reach of the river 1. The arrangement is such that the outlet 7 is normally always flooded, the level of water in the outlet portion of the channel 6 being determined by the natural level of the part of the river with which it communicates. Thus the pontoon structure 8 floats in the channel 6, being permitted to rise and fall with variations in the levels of the river by reason of the movement allowed by the hinged baffle 13, but maintaining a substantially constant difference of head of water between the inlet and outlet portions of the channel 6. Some slight leakage of water may occur between the sides 6a of the channel and the sides of the gate 12 and of the baffle plate 13 in contact therewith, as sufficient freedom must be left between the pontoon and the adjacent surfaces of the side walls 6a to permit the pontoon structure to rise and fall with changes in the level of water in the river. A suitable form of packing is preferably provided between the edges of the gate 12 and the walls 6a such as the packing strips 20 shown in the embodiment of the invention illustrated in Figs. 3 and 4 to form a slidable sealing engagement.

Figure 4:
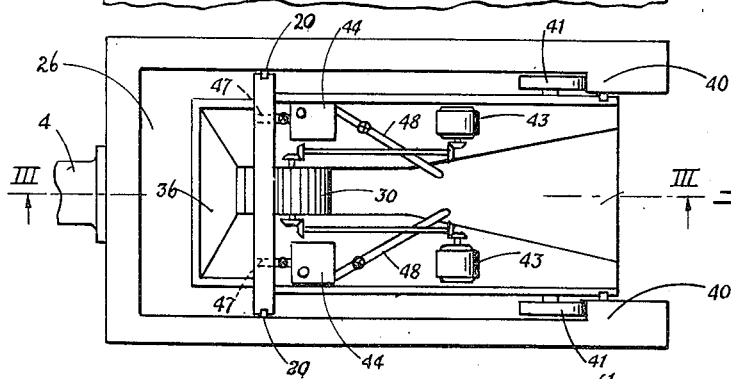
Fig. 4 is a plan corresponding to Fig. 3.

The construction shown in Figs. 3 and 4 is fundamentally substantially similar to that shown in Fig. 2, but the hinged baffle between the pontoon 28 and the bottom of the channel 26 consists of two plates 33, 33' hinged together and to an anchor plate 34 and hinge plate 35 respectively. In this construction the side walls 26a of the channel 26 are formed with buttresses 40 against which bear anti-friction rollers 41 mounted on the pontoon 28. The pressure exerted on the pontoon 28 in a horizontal direction by the head of water in the channel 26 is thus transmitted through the rollers 41 to the buttresses 40 and the pontoon is permitted to rise and fall according to variations in the river level, but is prevented from moving longitudinally. The millrace for the water wheel 30 takes the form of a funnel-shaped duct 36 at the inlet end of the pontoon 28. Water entering the channel 26 by way of the pipe 24 will be retained in the entry portion of said channel by the action of the baffle plate 33, 33' and the gate portion 32 of the pontoon 28, and will rise until it overflows into the duct 36 through which it will flow downwards to operate the water wheel 30. The latter is connected by gearing to a pair of dynamos 43.

It will be evident that the delivery of water to the wheel 30 may be controlled by raising or lowering the level of the top of the duct 36. This may be effected by the use of ballast tanks 44 mounted on the pontoon 28. The tanks 44 are connected to the inlet duct by valve-controlled pipes 47, while valve-controlled pipes 48 connect the lower part of said tanks with the tailrace 27. By admitting water to said tanks or by permitting it to flow from the tanks to the tailrace the pontoon 28 may be trimmed as desired, to increase or decrease the flow to the water wheel 30.

Figure 5:
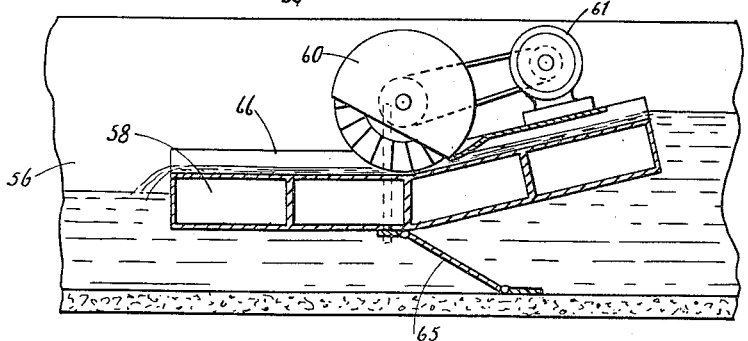
Fig. 5 is a sectional elevation of a further alternative form which the plant may take, the section being taken on line V—V of Fig. 6.
Figure 6:
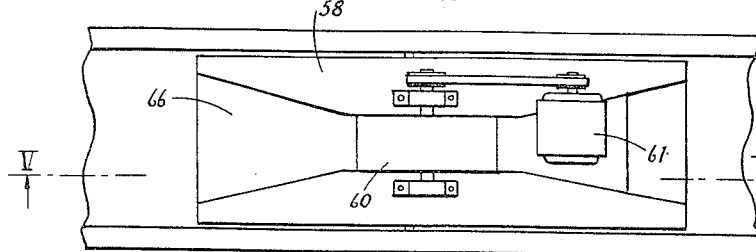
Fig. 6 is a plan corresponding to Fig. 5.

The invention is also applicable to the utilization of variations of the tide to the generation of power, in which case relatively small differences of head are involved. A construction suitable for this purpose is shown in Figs. 5 and 6, in which the pontoon 58 is anchored to the bottom of the channel 56 by a hinged baffle plate 65. The pontoon 58 is shaped and balanced so that the inlet end of the race 66 is higher than the outlet end thereof. The water wheel 60 is mounted near the centre of the pontoon 58 and extends into the race 66; it is connected by suitable gearing to a dynamo 61. The baffle plate 65 and the raised end of the pontoon (which is directed upstream with respect to the flow of water in the channel 56) serve as a gate causing head of water to be built up in the channel 56 until it overflows into the race 66, through which it flows down towards the lower end of the race 66 and thereby operates the wheel 60 associated therewith.

The particular type of water wheel or water turbine used in carrying out the invention is not material, an undershot type of wheel being shown in the accompanying drawings for convenience. The details of construction of the hydro-electric generator may be carried out in well-known manner, as may be preferred, and require no further description.

Hydro-electric power plants constructed as above described are relatively inexpensive to erect and to operate, since the head of water available for operating the water wheel or the like will remain substantially constant independently of the condition of the river or other source of water supply.

I claim:

1. A hydroelectric plant comprising a channel having vertical side walls, a pontoon structure within said channel and comprising a pair of spaced pontoons and an upwardly extending vertical front wall supported thereby and extending between the side walls of the channel, said vertical front wall being in slidable sealing engagement with the walls of the channel, a baffle plate hinged between the forward end of the pontoon structure and the bottom of the channel to cooperate with said vertical wall to form a dam, a reservoir ahead of said dam, a generator supported between said spaced pontoons, and means for conveying water from said reservoir to the space between said pontoons to drive said generator.

2. The apparatus of claim 1, the side walls of said channels having vertical surfaces thereon and transverse thereto, said pontoon structure having anti-friction roller means thereon cooperating with said vertical surfaces for guiding the pontoon structure in its vertical movement in the channel.

3. The apparatus of claim 1, and means for adjusting the level of one end of said pontoon structure with respect to the other end thereof comprising ballast tanks carried by said structure.

4. The apparatus of claim 1, and ballast tanks mounted on the pontoon structure above the level of said means, valve-controlled inlet pipes connecting the ballast tanks with the part of the channel upstream of the pontoon structure, and valve-controlled outlet pipes connected to the lower region of the ballast tanks.

References Cited in the file of this patent

UNITED STATES PATENTS

| | | |
|---|---|---|
| 757,909 | Gilliland | Apr. 19, 1904 |
| 1,670,140 | Cole | May 15, 1928 |
| 1,868,087 | Blair | July 19, 1932 |